Aug. 30, 1955 W. G. ARROWOOD 2,716,538
SOIL LOOSENING IMPLEMENT
Filed Feb. 18, 1953
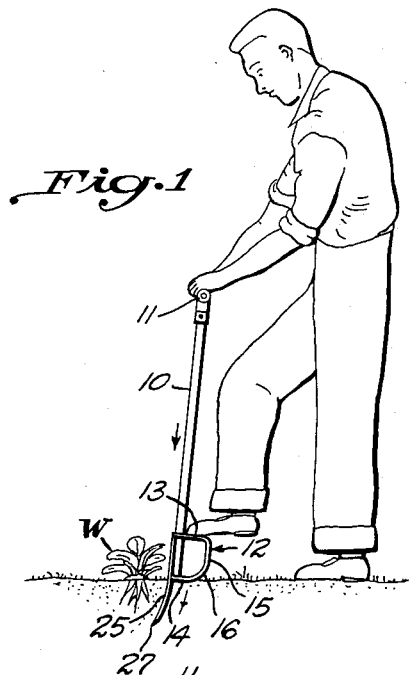
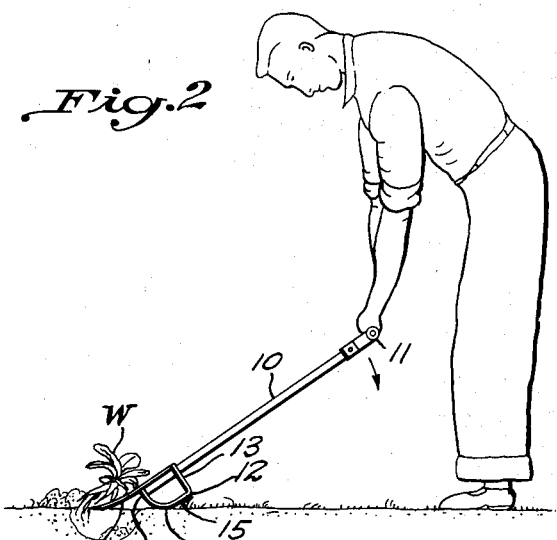
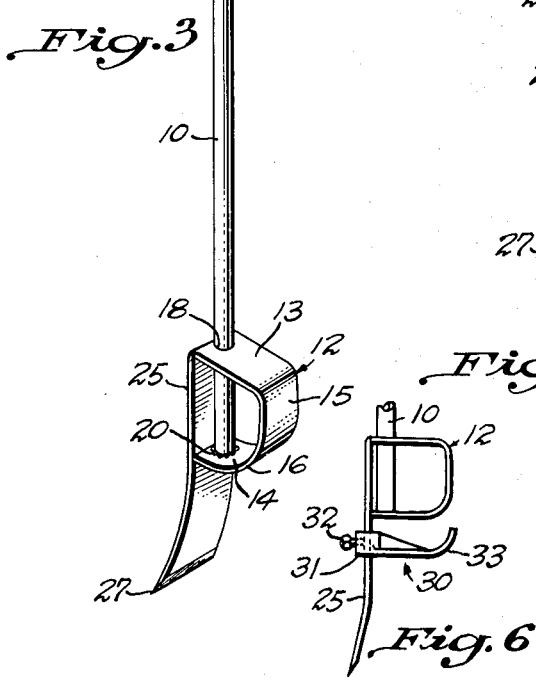
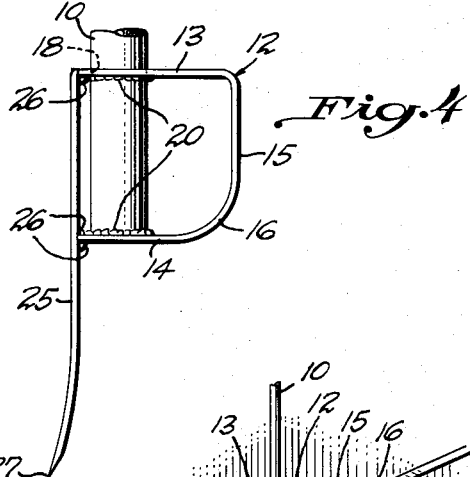
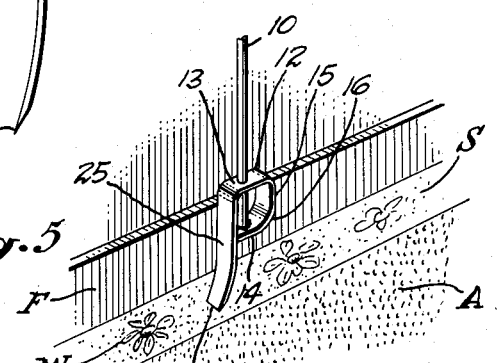
INVENTOR:
William G. Arrowood
BY
H. Stevenson
Agent.

United States Patent Office 2,716,538
Patented Aug. 30, 1955

2,716,538

SOIL LOOSENING IMPLEMENT

William G. Arrowood, Hawthorne, Calif.

Application February 18, 1953, Serial No. 337,532

4 Claims. (Cl. 254—131.5)

This invention relates generally to farming and gardening implements and more particularly to a tool designed for use primarily in loosening soil and removing weeds from the soil.

Various gardening implements or tools are currently employed for cultivating the soil to aerate the same and for removing weeds, the common spade and garden fork being typical examples. Such tools are subject to several disadvantages, one of which is that due to their relatively large size they are difficult to manipulate. That is to say, the forcing of their wide blades into the soil requires considerable effort which results in fatigue on the part of the operator. Moreover, such wide blades very frequently disturb the roots, and sometimes completely destroy plants adjacent the area where the soil is being loosened. It is also a recognized fact that the removal of weeds by the use of such conventional tools is practically impossible. For this reason, other tools of the pick or adz and wedge types have been employed for the purpose.

In cultivating and weeding small garden plots and lawns, small hand tools are now used and while certain of these tools are quite practical, their manipulation necessitates stooping or kneeling on the part of the person using them. In some cases, undesirable grass-like weeds having runners, such as devil grass, Bermuda grass, etc., may be present in a lawn and it is well nigh impossible to remove such grass-weeds by the use of existing tools without damaging the adjacent lawn areas. It is also a fact that conventional gardening or landscaping tools are wholly inadequate for cultivating or weeding in narrow spaces which may exist between walkways or driveways, adjacent building foundations, between flagstones, etc.

It is therefore an object of this invention to obviate the faults and deficiencies of conventional gardening tools by providing an implement which has a relatively long, narrow blade which may readily be forced into the soil and thereafter pried upwardly to loosen the earth, such a blade making it possible to cultivate or weed narrow areas of soil or lawns and further facilitating the removal of weeds having long roots by penetrating the soil to a point beneath the roots and then raising the entire weed.

Another object of the invention is to provide an implement, of the character referred to, in which the blade is attached to a relatively long handle so that the tool can be operated while the user assumes a standing position.

Another object is to provide a tool of the type indicated which has a rest or support, offset laterally from the axis of the handle and serving as a stop to limit penetration of the blade into the soil and also as a fulcrum about which the blade can be pivoted upwardly after it has been forced into the earth so as to loosen the soil or dislodge weeds therefrom.

Another object is to provide a tool, of the class referred to, in which the blade has a sharpened end to facilitate its insertion in the ground and in which the blade preferably is of tempered steel to provide great strength and some resiliency.

A further object is to provide a tool or implement of the type indicated which is simple in construction, economical to produce and one which is highly efficient in performing its intended function.

Further objects will appear from the following description and from the drawing, which is intended for the purpose of illustration only, and in which:

Fig. 1 is a side elevational view, illustrating the manner in which the blade of the implement is forced into the ground;

Fig. 2 is a view similar to Fig. 1, showing the tool rocked on its fulcrum to pry the soil or a weed upwardly;

Fig. 3 is a perspective view of the tool;

Fig. 4 is an enlarged detail of the lower portion of the tool;

Fig. 5 is a perspective view of a narrow strip of earth or lawn, illustrating how the tool may be used in cultivating such a strip; and Fig. 6 is a fragmentary side view of the lower portion of an implement of alternative construction.

Referring to the drawing in detail, the present tool or implement includes a relatively long tubular stem or shaft 10, to the upper end of which is secured a transverse handle 11. The tool also includes a bracket-like support element 12 of U shape having an upper horizontal portion or foot-rest 13, a lower horizontal portion or support 14, and a vertical connecting portion 15. At the intersection of the portions 14 and 15, the metal is rounded to provide a curved fulcrum 16.

The foot-rest 13 is provided with an aperture 18 through which the stem 10 extends, the lower extremity of the stem abutting the upper surface of the rest portion 14. The stem 10 and support element 12 are permanently connected by welding their contacting portions, as indicated at 20.

A substantially vertical blade 25, preferably of tempered steel, extends across the ends of the portions 13 and 14 and welded thereto as shown at 26. The lower curved portion of the blade 25 slopes downwardly and forwardly in divergent relation to the axis of the stem or shaft 10, the lower end of the blade being beveled at the rearward side to provide a sharp edge 27.

Assuming that it is desired to loosen the soil, the implement is first placed with the edge 27 of its blade 25 against the surface of the ground. Holding the implement in erect position by means of the handle 11, the operator places his or her foot upon the foot-rest 13 and applies a downward thrust to force the blade 25 downwardly into the ground. Penetration of the blade into the earth is limited by the engagement of the support portion 14 against the surface of the ground, as shown in Fig. 1.

With the major portion of the blade 25 thus embedded in the soil, the operator's foot is removed from the foot-rest 13. The stem 10 is then drawn toward the operator, by means of the handle 11, with the entire implement pivoting by reason of its fulcrum portion 16 rolling or rocking upon the surface of the ground. The implement thus may be regarded as a lever of the first class wherein the fulcrum is located intermediate the ends. Consequently, downward pivotal movement of the stem 10 causes upward pivotal movement of the blade 25, as indicated in Fig. 2. The blade thus is, in effect, pried upwardly through the soil to loosen the same.

As the blade 25 emerges from the soil, the implement is tilted to erect position and moved to another adjacent location, after which the procedure outlined above is repeated. Thus, by applying the tool to use in this manner, the tightly packed soil is effectively loosened.

The gardening implement is applied to use in a similar manner to remove weeds from the ground, the end of the blade 25 being first guided into position adjacent the root of the weed W, after which the tool is pivoted to cause the blade to engage and dislodge the root directly or to so loosen the soil adjacent the root that the weed may readily be pulled from the ground.

Due to the relatively narrow character of the blade 25, the implement may be employed for loosening the soil and removing weeds in narrow areas of the ground, for example in a narrow strip of ground or lawn S located between the foundation F of a building and a walkway A, as shown in Fig. 5.

It will be observed from the foregoing that my invention provides a soil-cultivating and weed-removing implement which is highly practical and efficient in use. Due to its relatively narrow size, the blade is easily pushed into the ground, even when the latter is solidly packed. In addition, upward movement of the blade is in a relatively narrow path so that loosening of the soil is controlled to the extent that adjacent plants remain undisturbed. Moreover, the blade may be employed in narrow ground areas where the use of a spade or fork is impossible.

As another important feature, the implement has a support element which serves the several purposes of providing a foot-rest or step by which foot pressure is imparted to force the blade into the ground, providing a stop for limiting penetration of the blade into the ground, and providing a fulcrum by which the implement may be pivoted with a prying action. Due to the fact that the fulcrum is offset from the axis of the implement in a direction toward the operator, the blade is withdrawn completely from the ground as the handle is lowered to a point adjacent the ground surface. This is an improvement over conventional tools, such as spades or shovels, where the fulcrum is the heel of the blade itself, thus making it extremely difficult to pry the blade completely out of the packed soil and frequently resulting in cracking the blade.

Referring now to Fig. 6, it is within the concept of this invention to provide a combined stop and fulcrum member 30, formed as a separate part. As shown, the member 30 consists of a boss or slide 31 having a rectangular hole to adapt it for mounting on the blade 25, the boss carrying a set-screw 32 engageable with the blade to retain the member in different positions of vertical adjustment. The member 30 also has a laterally extending, curved finger 33 underlying the support element 15.

The boss 31 serves as a stop for limiting penetration of the blade into the soil, and by adjusting the stop vertically, any degree of penetration is readily attained. The curved end of the finger 33 provides the fulcrum by which the implement can be pivoted on the ground, in the manner and for the purpose previously explained in connection with the embodiment of the invention illustrated in Figs. 1 through 5.

While I have herein shown and described the implement as embodied in a preferred form of construction by way of example, it will be apparent that various modifications might be made in the construction without departing from the spirit of the invention. Consequently, I do not wish to be limited in this respect but desire to be afforded the full scope of the appended claims.

I claim as my invention:

1. An implement of the class described, comprising: a U-shaped support element having an upper horizontal step portion, a lower horizontal rest portion and a vertical connecting portion, said step portion having an aperture therein, the intersection of said rest portion and said connecting portion being arcuate and providing a fulcrum by which the element can be pivoted upon the ground; a vertical stem extending downwardly through said aperture with its lower end abutting said rest portion, the portion of the stem at said aperture being retained therein by welding and said lower end being secured to said rest portion by welding; and a relatively narrow, substantially vertical blade welded to the ends of said step and rest portions and extending below said support element, the lower end of said blade having a sharp cutting edge.

2. An implement of the class described, comprising: a U-shaped support element having an upper horizontal step portion, a lower horizontal rest portion and a vertical connecting portion, said step portion having an aperture therein, the intersection of said rest portion and said connecting portion being arcuate and providing a fulcrum by which the element can be pivoted upon the ground; a vertical stem extending downwardly through said aperture with its lower end abutting said rest portion, the portion of the stem at said aperture being retained therein by welding and said lower end being secured to said rest portion by welding; and a relatively narrow, substantially vertical, curved blade welded to the ends of said step and rest portions and extending below said support element, the lower end of said blade having a sharp cutting edge.

3. An implement of the class described, comprising: a U-shaped support element having an upper horizontal step portion, a lower horizontal rest portion and a vertical connecting portion, said step portion having an aperture therein, the intersection of said rest portion and said connecting portion being arcuate and providing a fulcrum by which the element can be pivoted upon the ground; a vertical stem extending downwardly through said aperture with its lower end abutting said rest portion, the portion of the stem at said aperture being retained therein by welding and said lower end being secured to said rest portion by welding; and a relatively narrow, substantially vertical, curved blade welded to the ends of said step and rest portions and extending below said support element, the lower end of said blade having a sharp cutting edge, said blade and said fulcrum being on opposite sides of the axis of said stem.

4. An implement of the class described, comprising: a U-shaped support element having an upper horizontal step portion, a lower horizontal rest portion and a vertical connecting portion, said step portion having an aperture therein, the intersection of said rest portion and said connecting portion being arcuate and providing a fulcrum by which the element can be pivoted upon the ground; a vertical stem extending downwardly through said aperture with its lower end abutting said rest portion, the portion of the stem at said aperture being retained therein by welding and said lower end being secured to said rest portion by welding; and a relatively narrow, substantially vertical, curved blade welded to the ends of said step and rest portions and extending below said support element, the lower end of said blade having a sharp cutting edge, said blade and said fulcrum being on opposite sides of the axis of said stem, said blade being resilient.

References Cited in the file of this patent

UNITED STATES PATENTS

| 1,131,714 | Kress | Mar. 16, 1915 |
| 1,141,659 | Scott | June 1, 1915 |
| 1,998,314 | Gilstrap et al. | Apr. 16, 1935 |
| 2,247,958 | Maxcy | July 1, 1941 |

FOREIGN PATENTS

| 30,119 | Great Britain | Dec. 31, 1896 |
| 113,646 | Sweden | Jan. 25, 1945 |